United States Patent
Konrad et al.

(10) Patent No.: US 6,702,957 B2
(45) Date of Patent: Mar. 9, 2004

(54) PROCESS AND APPARATUS FOR PRODUCING OXIDIC NANOCRYSTALS

(75) Inventors: Armin Konrad, Schwabmuenchen (DE); Torsten Fries, Stadtbergen (DE); Alfred Gahn, Berlin (DE); Franz Kummer, Munich (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/992,883

(22) Filed: Nov. 6, 2001

(65) Prior Publication Data

US 2002/0051740 A1 May 2, 2002

Related U.S. Application Data

(62) Division of application No. 09/619,802, filed on Jul. 20, 2000, now Pat. No. 6,391,273.

(30) Foreign Application Priority Data

Aug. 5, 1999 (DE) .......................... 199 36 868

(51) Int. Cl.[7] .......................... C09K 11/78; C09K 11/80
(52) U.S. Cl. ............................................. 252/301.4 R
(58) Field of Search .................... 252/301.4 R, 301.4 S

(56) References Cited

U.S. PATENT DOCUMENTS

| 5,358,695 | A | | 10/1994 | Helble et al. .................. 423/592 |
| 5,455,489 | A | | 10/1995 | Bhargava .................. 315/169.4 |
| 5,637,258 | A | * | 6/1997 | Goldburt et al. ........ 252/301.4 R |
| 5,876,683 | A | | 3/1999 | Glumac et al. .................. 423/325 |
| 5,893,999 | A | * | 4/1999 | Tamatani et al. ...... 252/301.4 R |
| 5,958,361 | A | | 9/1999 | Laine et al. .................. 423/592 |
| 6,036,886 | A | * | 3/2000 | Chhabra et al. ........ 252/301.4 R |
| 6,379,583 | B1 | * | 4/2002 | Gray et al. ............. 252/301.4 R |

OTHER PUBLICATIONS

1 Williams et al., *Preparation and Fluorescence Spectroscopy of Bulk Monoclinic $Eu^{3+}$: $Y_2O_3$ and comparison to $Eu^{3+}$: $Y_2O_3$ Nanocrystals*, J. Phys. Chem. B, 102 (1998) pp. 916–920.

* cited by examiner

Primary Examiner—C. Melissa Koslow
(74) Attorney, Agent, or Firm—Robert F. Clark

(57) ABSTRACT

The present invention relates to oxidic nanocrystals and a process and apparatus for producing oxidic nanocrystals from metalorganic compounds or volatile inorganic compounds. In particular, the process is suitable for oxidic or oxysulfidic nanocrystals, particularly based on the elements Y, Gd, Mg, Ca, Ba and Al. The nanocrystals preferably have a mean initial particle size of 1 to 20 nm.

8 Claims, 3 Drawing Sheets

PROCESS AND APPARATUS FOR PRODUCING OXIDIC NANOCRYSTALS

CROSS REFERENCES TO RELATED APPLICATIONS

This application is a division of application Ser. No. 09/619,802 filed Jul. 20, 2000, now U.S. Pat. No. 6,391,273.

TECHNICAL FIELD

The present invention relates to a process and an apparatus for producing oxidic nanocrystals.

BACKGROUND OF THE INVENTION

Oxidic nanocrystals, in particular doped oxidic nanocrystals, such as for example europium-activated yttrium oxide ($Y_2O_3$:Eu) have been paid increasing attention in recent years for use as phosphors for illumination equipment (U.S. Pat. No. 5,455,489). For this reason, a very wide variety of oxidic nanocrystals have been tested for suitability for use as a phosphor. Consequently, corresponding processes and apparatus for producing nanocrystals of this type have also been proposed.

For example, to produce $Y_2O_3$:Eu, gas condensation techniques are known, cf. for example D. K. Williams et al., J.Phys.Chem.B 102(1998), p.916. However, a drawback of these known processes is that the resultant oxidic nanocrystals are of highly amorphous structure and, in addition, have a monoclinic crystal structure. However, for the oxidic nanocrystals to be used as phosphors it is desirable for them to be in the cubic equilibrium phase, since this is when the light efficiency is highest.

To achieve this, hitherto the amorphous or monoclinic phase has been transformed into the cubic phase by an additional heat treatment at approximately 900° C. However, this entails considerable grain growth, and consequently the cubic phase is only present as a single phase at ultimate particle sizes of over about 50 nm. This in turn, on the one hand, means a high outlay in terms of energy and time for the production of nanocrystals of this type. On the other hand, the relatively large ultimate particle size considerably limits the possible applications of these oxidic nanocrystals which are produced using processes according to the prior art. Hitherto, it has not been possible to produce phosphors with small ultimate particle sizes, in particular of up to 20 nm, which have a high level of efficiency. The term ultimate particle size is understood to mean the grain size of the phosphor following a heat treatment which may lead to partial agglomeration. The agglomeration can be classified as low if there is as yet no sintering of the grains at the boundary surfaces, although grains may already be arranged next to one another in rows. By contrast, the term initial particle size is used if the original grain size prior to a heat treatment is what is meant.

SUMMARY OF THE INVENTION

The object of the present invention is to provide a process for producing oxidic nanocrystals which ensures that suitable cubic nanocrystals of small ultimate particle sizes can be produced easily without an additional heat treatment.

A further object of the present invention is to provide an apparatus for producing oxidic nanocrystals which overcomes the drawbacks of the prior art cited in the introduction.

These objects are achieved by a process and an apparatus in accordance with the features of the independent claims.

Advantageous configurations are described in the subclaims.

A process according to the invention for producing oxidic nanocrystals comprises the following steps:

a) Introducing host lattice ions as metalorganic complexes or volatile inorganic compounds into at least a first vaporizer, b) Converting the complexes or compounds into the gas phase and c) Transporting the resultant gas phase, with the aid of one or more carrier gases and/or carrier gas mixtures, into at least one heating zone of at least one reactor, and supplying one or more reaction gases and/or reaction gas mixtures (into the heating zone), and d) Breaking down the complexes or compounds in the heating zone of the reactor at a pressure of between 1–1000 mbar, the oxidic nanocrystals being formed immediately, and e) Collecting the oxidic nanocrystals at at least one adsorption trap.

The term vaporizer in this context means a vaporization system of which the essential components are vessel and associated heating means.

With this process according to the invention, it is possible to produce oxidic nanocrystals which are present in a thermodynamic equilibrium phase and have a mean initial particle size of at most 100 nm, preferably of 1 to 20 nm, in particular an initial particle size in the region of 10 nm, and a cubic crystal structure. They may in particular be relatively unagglomerated, preferably with a mean ultimate particle size of up to 20 nm. The cubic equilibrium phase of the oxide is reached even during the production process. The cubic equilibrium phase is particularly important for phosphors with a high quantum efficiency which are based on oxides of this type, such as for example yttrium oxide ($Y_2O_3$), gadolinium oxide ($Gd_2O_3$) or corresponding garnets, such as cerium-activated yttrium aluminum garnet, YAG:Ce or cerium-activated yttrium gadolinium aluminum garnet, (YGd)AG:Ce.

By suitably conducting the reaction, it is possible in particular to produce phosphors with a narrow size distribution. A fluctuation range of 2 to 5 nm about the mean initial particle size is typical.

In general terms, the process is suitable in particular for oxidic or oxysulfidic nanocrystals, particularly based on the elements Y, Gd, Mg, Ca, Ba and Al and other rare-earth elements.

In an advantageous configuration of the process according to the invention, in process step a), together with the host lattice ions, doping ions are introduced into a second vaporizer as metalorganic complexes or volatile inorganic compounds and are converted into the gas phase. The resultant gas phase is transported into the heating zone of the reactor with the aid of one or more carrier gases and/or carrier gas mixtures. This makes it possible to produce not only undoped oxides but also doped, (primarily in the sense of an activation) nanocrystalline oxides. In this case, the doping is incorporated directly into the host lattice.

The undoped or doped nanocrystalline oxides are used as phosphors for illumination equipment with low or high luminances. Consideration may be given in particular to fluorescent lamps, noble gas (Xe) excimer lamps, displays and organic and inorganic LEDs. Depending on the particular requirements, the host lattice ions are elements from main groups II to VI of the Periodic System of the Elements. The doping ions are rare-earth elements such as Eu, Ce or Tb. If metalorganic complexes are used, compounds of the host lattice ions (or doping ions) with hydrogen tetramethylheptanedionate are eminently suitable for the process. Examples of suitable volatile inorganic compounds are chlorides.

In a further advantageous configuration of the process according to the invention, the first and second vaporizers are each at a temperature of approximately 30°–900° C. The temperature in the heating zone of the reactor is approximately 600°–1600° C. Furthermore, inert gases or gas mixtures are used as carrier gases. The noble gases or nitrogen or mixtures thereof are used in particular. Oxygen or an oxygen-containing mixture has proven to be a suitable reaction gas.

In another advantageous configuration of the process according to the invention, the flow rate of the carrier gas or the carrier gas mixtures in the system is 20 ml/min to 50 l/min. The flow rate of the reaction gas and/or the reaction gas mixtures is 50 ml/min to 100 l/min.

According to the invention, the pressure in the entire system is held at 1 to 1500 mbar.

An apparatus according to the invention for producing oxidic nanocrystals comprises at least one vaporizer, at least one reactor with at least one heating zone, at least one adsorption trap and at least one vacuum pump. With this apparatus it is possible to produce the desired oxidic nanocrystals for use as phosphors. A further, additional heat treatment outside the heating zone of the reactor in order to obtain the desired cubic crystal form of the nanocrystals is no longer required, unlike in the prior art.

In an advantageous configuration of the invention, the vaporizers have vaporizer heating means which are designed as oil baths. The temperature of the oil baths is in each case approximately 140° to 180° C. The reactor is advantageously designed as a flow reactor.

In a further advantageous configuration of the apparatus according to the invention, in each case one heatable tube is arranged between the vaporizer(s) and the reactor. According to the invention, this prevents the metalorganic complexes or inorganic compounds which have been converted into the gas phase from condensing early.

In a further advantageous configuration of the apparatus according to the invention, the reactor comprises an aluminum tube and a cylindrically designed heating zone. A baffle is arranged inside the reactor at the end of the heating zone. The baffle which is arranged in this way prevents convection in the reverse direction, i.e. counter to the direction in which the gas phase flows in, so that the formation of the oxidic nanocrystals takes place in the desired areas of the heating zone of the reactor.

In a further advantageous configuration of the apparatus according to the invention, a filter is arranged between a second adsorption trap, which is connected downstream of the first adsorption trap, and the vacuum pump. The second adsorption trap and the filter prevent contamination to the vacuum pump. The adsorption traps are usually designed as cold traps.

Further details, features and advantages of the process according to the invention and the apparatus according to the invention are explained below with reference to an exemplary embodiment illustrated in the figures, in which:

DETAILED DESCRIPTION OF THE INVENTION

Figure 1:
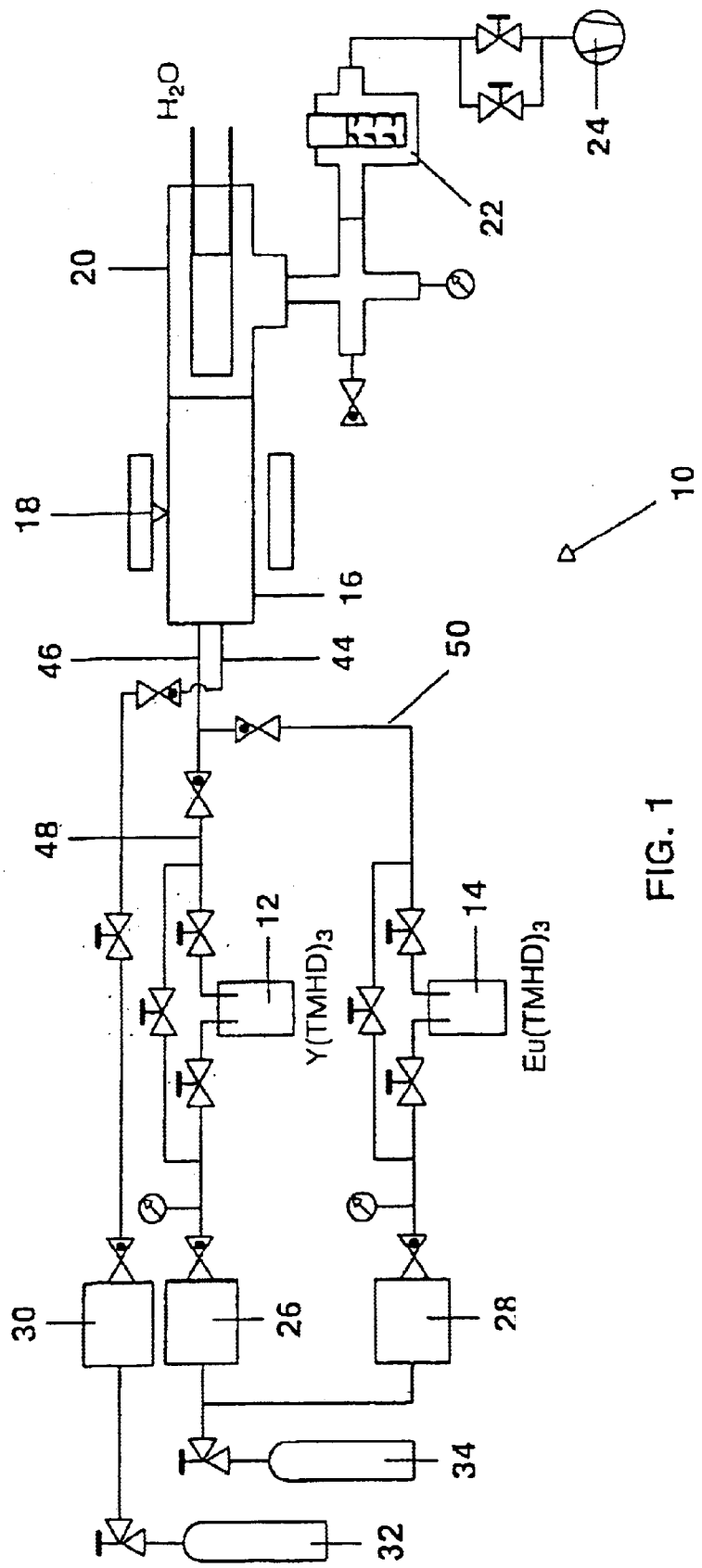
FIG. 1 diagrammatically depicts the apparatus according to the invention for producing oxidic nanocrystals.

An apparatus 10 for producing oxidic nanocrystals which is illustrated in FIG. 1 comprises a first vaporizer 12 and a second vaporizer 14, a reactor 16 with a heating zone 18, a first adsorption trap 20 which is connected downstream of the reactor 16 and a vacuum pump 24 which is connected downstream of the first adsorption trap 20 and is connected thereto. A second cold trap 22 is arranged between the vacuum pump 24 and the first adsorption trap 20.

The apparatus 10 illustrated in the exemplary embodiment is used to produce doped oxidic nanocrystals, namely europium (Eu)-doped yttrium oxide ($Y_2O_3$:Eu). Metalorganic complexes of yttrium or europium, namely yttrium tetramethylheptanedionate and europium tetramethylheptanedionate ($Y(TMHD)_3$ or $Eu(TMHD)_3$) are converted into the gas phase in the first vaporizer 12 or in the second vaporizer 14. The resultant gas phases of the complexes are transferred into the reactor 16 with the aid of a carrier gas. In each case, one heatable tube 48, 50 is arranged between the vaporizers 12, 14 and the reactor 16. In this exemplary embodiment, the carrier gas used is argon which is fed into the system from a carrier gas source 34. The flow rate of the carrier gas is controlled, by means of a first flow regulator 26 and a second flow regulator 28, to typically 20 ml/min–50 l/min, preferably 150–250 ml/min. Both vaporizers 12, 14 are at a temperature of approximately 30°–900° C., preferably 140°–180° C., which are produced by vaporizer heating means which are designed as oil baths.

The reactor 16 is designed as a flow reactor (FIG. 2) and comprises an aluminum tube 52 and the heating zone 18, which is of cylindrical design. A baffle 40 is arranged inside the reactor 16 at the end of the heating zone 18 (cf. FIG. 2). The baffle 40 is used to control the convection inside the reactor 16 or inside the heating zone 18. The temperature in the heating zone 18 of the reactor 16 is approximately 600°–1600° C., preferably 900°–1100° C.

At the same time as the gaseous metalorganic complexes, a reaction gas or a mixture thereof is fed into the reactor 16 from a reaction gas source 32. The reaction gas used is generally oxygen or mixtures thereof. A feed line 44 passes the reaction gas oxygen into the reactor chamber at a flow rate of 50 ml/min–100 l/min, preferably 700–900 ml/min, which rate is controlled by means of a third flow regulator 30. In the heating zone 18 of the reactor 16, at a pressure of between 1–1000 mbar, the metalorganic complexes are broken down and the oxidic nanocrystals are formed immediately, in particular the $Y_2O_3$:Eu nanocrystals are formed.

A first adsorption trap 20 is connected downstream of the reactor 16. This adsorption trap 20 is designed as a cold trap at which the resultant nanocrystals are collected. The vacuum pump 24, which maintains the pressure in the entire system at approximately 40–60 mbar, is connected downstream of the first adsorption trap 20. Pressures of between 1–1500 mbar in the entire system are also conceivable. To prevent contamination to the vacuum pump 24, a second adsorption trap 22, which is likewise designed as a cold trap, and a filter (not shown) are connected between the first adsorption trap 20 and the vacuum pump 24.

The doped oxidic nanocrystals produced in this way, namely $Y_2O_3$:Eu nanocrystals, have a cubic crystal structure and an initial particle size of between 1 nm and 100 nm, in particular 5 to 20 nm. In addition, they are relatively unagglomerated. Typically, $Y_2O_3$:Eu is a phosphor. The oxidic nanocrystals produced in this way are used as phosphors for illumination equipment with low or high luminances.

Figure 2:
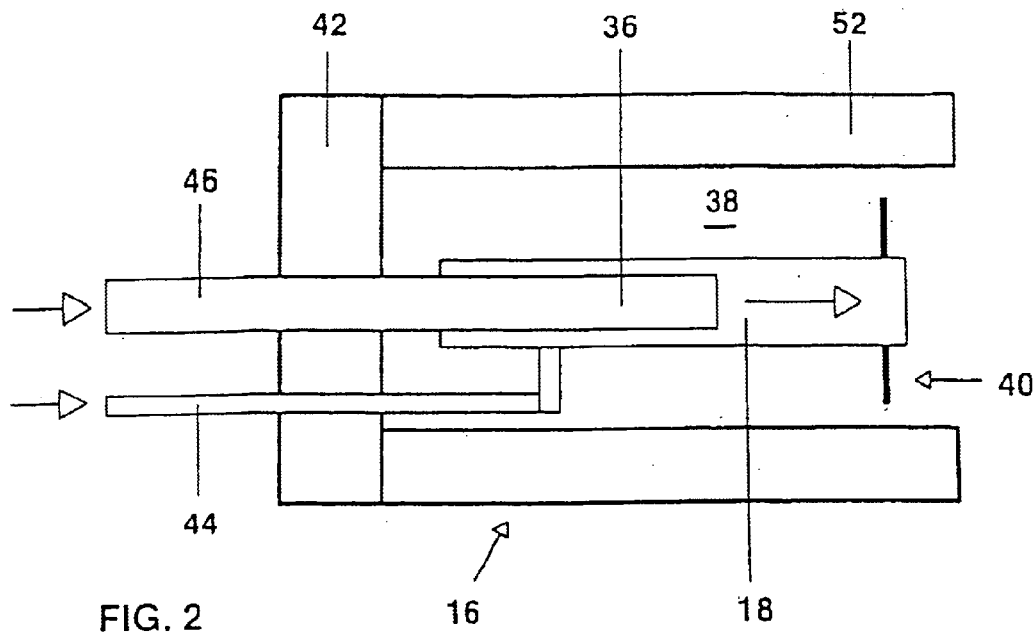
FIG. 2 diagrammatically depicts a partial region of a reactor of the apparatus according to the invention for producing oxidic nanocrystals.

FIG. 2 shows a diagrammatic illustration of a partial region of the reactor 16, showing the baffle 40 which is arranged in the interior 38 of the reactor 16, i.e. inside the aluminum tube 52. Furthermore, it can be seen that the aluminum tube 52 is closed off on one side by means of a flange 42. The feed lines 44 and 46 pass through openings in the flange 42 into the interior of the reactor or the heating zone 18 of the reactor 16. In the exemplary embodiment shown in FIG. 2, a feed line 46 introduces the carrier gas and the gaseous metalorganic complex of the host lattice ion into the reactor 16, and the feed line 44 introduces the reaction gas and the gaseous metalorganic complex of the doping ion into the reactor 16.

Figure 3:
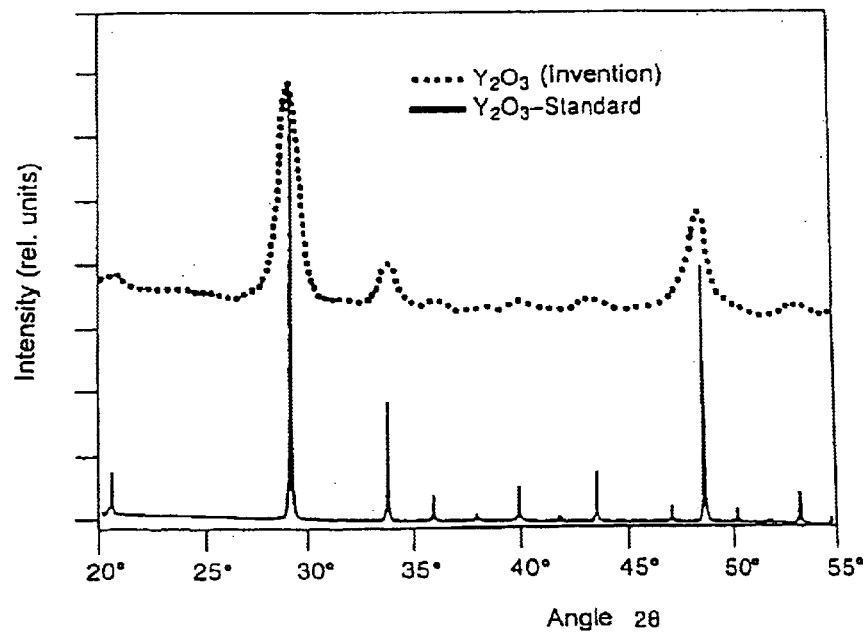
FIG. 3 shows a diffractogram of the oxidic nanocrystals produced using the process according to the invention.

FIG. 3 shows a diffractogram for nanocrystalline $Y_2O_3$ which has been produced using the process according to the invention with the apparatus 10 according to the invention. The pulverulent $Y_2O_3$ standard, against which the diffractogram of the $Y_2O_3$ produced has been plotted, has a purity of 99.999% and a grain size of approximately 10 $\mu$m. The designated standard is a powder which has sufficiently coarse crystals, so that its optical properties match those of a corresponding single crystal. The comparison shows that the diffraction patterns of the $Y_2O_3$ produced according to the invention and of the $Y_2O_3$ standard correspond excellently. It can be seen that the nanocrystals produced according to the invention have a cubic crystal structure (like the single crystal) without an additional heat treatment being required.

Figure 4A:
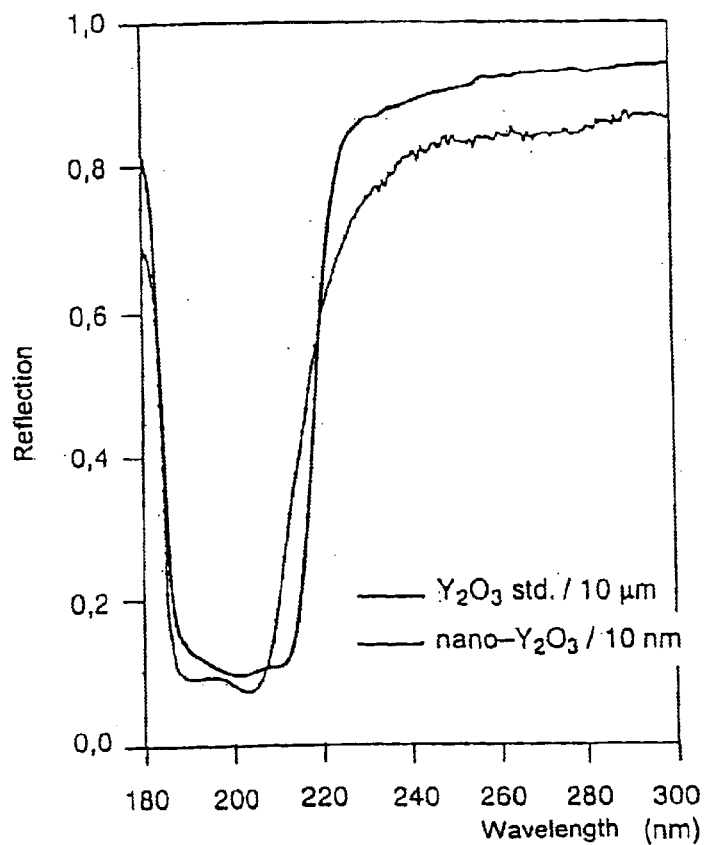
FIG. 4 shows the diffuse reflection spectrum of $Y_2O_3$ (FIG. 4a) and the excitation spectrum of Eu-doped $Y_2O_3$ (FIG. 4b), in each case with a coarse-grained standard compared with a nanocrystalline powder.

The nanocrystalline $Y_2O_3$ and $Y_2O_3$:Eu produced according to the invention exhibits a shift of the absorption edge (located at the long-wave end and associated with the host lattice) of approx. 10 nm toward shorter wavelengths (corresponding to a higher energy) compared to the coarse-crystal reference material. Consequently, the excitation optimum is also at higher excitation energies. However, the emission properties remain unchanged. This characteristic is noteworthy in two respects:

Firstly, it is possible to tailor or optimize the absorption edge of the nanocrystalline phosphor. In the case of $Y_2O_3$, as shown in FIG. 4a it can be shifted from 214 nm (standard) to 204 nm, corresponding to an energy difference of 0.2 eV (increase from 5.85 to 6.05 eV). The smaller the initial particle size, the greater the shift, in particular at initial particle sizes of below 20 nm. FIG. 4a shows a comparison between the standard (mean initial particle size 10 $\mu$m) and the powder according to the invention (mean initial particle size 10 nm).

Figure 4B:
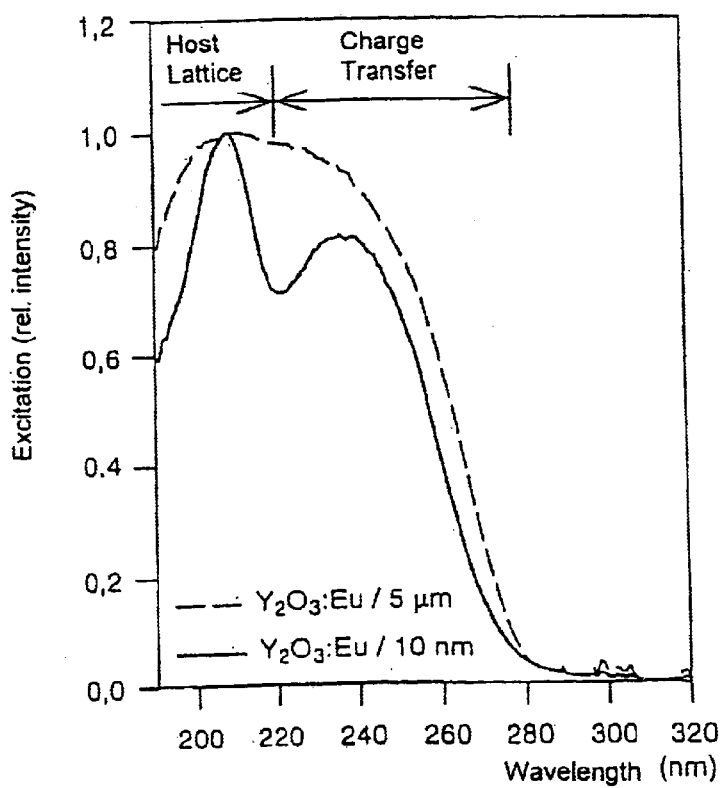

Secondly, a wider range of activation applications is possible. For example, europium provides the best illumination as activator in the host lattice $Y_2O_3$ (FIG. 4b). However, if a sufficiently nanocrystalline powder is used, other rare-earth elements are also suitable activators.

What is claimed is:

1. A phosphor for illumination equipment, the phosphor consisting of oxidic nanocrystals having a host lattice of $Y_2O_3$, $Gd_2O_3$, YAG, or (YGd)AG wherein the host lattice has a cubic crystal structure and is activated by a rare-earth element; the nanocrystals having a mean initial particle size of 1 to 20 nm.

2. The phosphor as claimed in claim 1 wherein the nanocrystals have a mean ultimate particle size of up to 20 nm.

3. A phosphor for illumination equipment, the phosphor consisting of oxidic nanocrystals having a host lattice of yttrium oxide, wherein the host lattice has a cubic crystal structure and is activated with a rare-earth element, the nanocrystals having a mean initial particle size of 1 to 20 nm and a mean ultimate particle size of up to 20 nm.

4. The phosphor as claimed in claim 3 wherein the absorption edge of the host lattice is shifted toward shorter wavelengths compared to a coarser standard of the same material having optical properties of a corresponding single crystal.

5. The phosphor as claimed in claim 1 wherein the nanocrystals have a fluctuation range of 2 nm to 5 nm about the mean initial particle size.

6. The phosphor as claimed in claim 3 wherein the nanocrystals have a fluctuation range of 2 nm to 5 nm about the mean initial particle size.

7. The phosphor as claimed in claim 3 wherein the rare-earth element is europium.

8. The phosphor as claimed in claim 4 wherein the rare-earth element is europium.

* * * * *